March 30, 1948. H. POLLITT 2,438,765
ADJUSTABLE ANVIL FOR MICROMETER CALIPERS
Filed Jan. 10, 1944
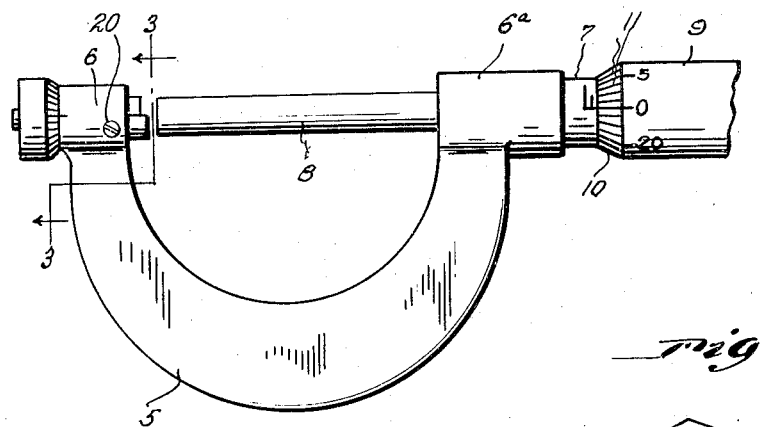
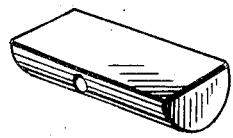
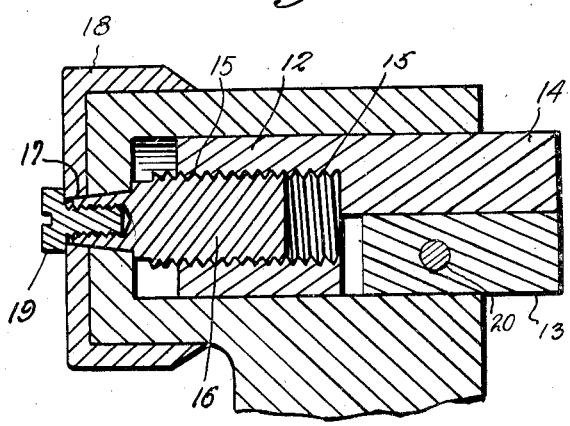
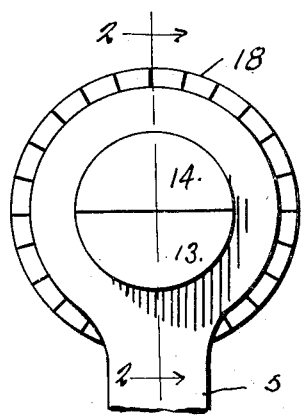
Inventor
Harold Pollitt
By Clarence A. O'Brien
and Harvey B. Jacobson
Attorneys Patented Mar. 30, 1948

2,438,765

UNITED STATES PATENT OFFICE 2,438,765

ADJUSTABLE ANVIL FOR MICROMETER CALIPERS

Harold Pollitt, Waukegan, Ill.

Application January 10, 1944, Serial No. 517,696

2 Claims. (Cl. 33—164)

This invention relates to caliper gauges, and has more particular reference to a combined micrometer caliper and snap gauge.

In carrying out the present invention, I provide a micrometer caliper with an anvil including a fixed portion and an adjustable portion or section movable toward or away from the spindle of the micrometer caliper, whereby the sections of the anvil may be selectively employed so as to enable the device to be used either as a micrometer caliper or as a snap gauge.

A specific object of the invention is to provide an improved anvil, in a combined caliper and gauge of the above kind, wherein the fixed and adjustable sections of the anvil are of unique form and arrangement, and wherein simple and efficient adjusting means is provided for the movable or adjustable section of the anvil.

The present invention consists in the novel form, combination and arrangement of parts hereinafter more fully described, shown in the accompanying drawing and claimed.

In the drawing, wherein like reference characters indicate corresponding parts throughout the several views:

Figure 1 is a side elevational view of a combined micrometer caliper and snap gauge constructed in accordance with the present invention.

Figure 2 is an enlarged fragmentary vertical section taken on line 2—2 of Figure 3.

Figure 3 is an enlarged fragmentary vertical section taken on the line 3—3 of Figure 1.

Figure 4 is a perspective view of the fixed anvil section, as shown in Figure 2.

Referring in detail to the drawing, 5 indicates a U-frame having inwardly facing aligned sockets 6 and 6a on the ends thereof. Associated with the socket 6a is a sleeve 7, and extending through said socket 6a is the movable spindle 8 carried by a rotatable thimble 9 having a beveled edge 10 divided into twenty-five parts by calibrations 11 so that to turn the thimble by the length of one part moves the spindle 8 .001 inch. Accordingly, one full rotation of thimble 9 moves the spindle 8 .025 inch, and the sleeve 7 is usually provided with a vernier scale to permit .001 inch to be measured. Thus far described, the construction is identical with that of conventional micrometer calipers in which the socket 6 usually carries a stationary or fixed anvil opposed to the end of spindle 8.

In accordance with the present invention, the socket 6 is provided with a sectional anvil including an adjustable main section 12 and a stationary or fixed section 13. The main section 12 has an outer end portion snugly slidably fitted in the bore of socket 6 and provided at its inner end with an integral projecting contact 14 of semi-circular form in cross section. Also, the section 12 is provided in its outer portion with an axial threaded bore 15 in which is threaded a screw 16 whose outer end is non-rotatably fitted in a central aperture 17 of a calibrated cap 18 fitted over the outer end of socket 6. The adjusting screw 16 and cap 18 are secured together by a screw 19 passing through the cap and threaded into the outer end of the adjusting screw 16. The fixed or stationary anvil section 13 projects inwardly beyond the inner end of socket 6 and is secured in position by any suitable means, such as a screw 20, passing through said section 13 and threaded into the socket 6.

The arrangement is such that the contact portion 14 of the anvil section 12 may be projected inwardly beyond the inner end of fixed anvil section 13 for use, or it may be retracted outwardly beyond the inner end of said fixed anvil section 13 when the latter is desired for use. It is obvious that by rotating cap 18, the screw 16 may be turned for adjusting the anvil section 12 toward or away from spindle 8, section 12 being held against rotation by the engagement of the flat side of contact member 14 with the adjacent flat side of fixed anvil section 13. The snugly fitting portion of the anvil section 12 forms a stop for engaging the fixed anvil section 13 to limit projection of said contact portion 14 outwardly of the inner end of said fixed anvil section 13.

The purpose of the invention is to eliminate the necessity of using a multitude of snap gauges. In use, assuming that a part is made to $200/1000$ of an inch with a tolerance of plus and minus $5/1000$, the micrometer spindle 8 is set to $195/1000$, and the adjustable anvil section 12 is adjusted to $10/1000$. This will allow the operator to check each piece without changing the micrometer setting, and will thereby eliminate a snap gauge for this measurement. By the use of the adjustable anvil section, the device provides an adjustable snap gauge for any dimension, and allows tolerance up to $50/1000$ plus and minus.

From the foregoing description, it will be seen that I have provided a micrometer caliper with an adjustable anvil section so that the frame may be used for measuring tolerance variations in a simple and expeditious manner without the use of separate snap gauges.

The construction and operation, as well as the advantages of the invention, will be apparent to those skilled in the art, and minor changes in details of construction are contemplated, such as fairly fall within the spirit and scope of the invention as claimed.

What I claim as new is:

1. An anvil structure for use on the frame of a micrometer comprising a barrel having a closed end and adapted to form a part of said frame, a stationary anvil section extending part way out of the other end of the barrel and permanently fixed therein against movement relative thereto, a movable anvil section slidably fitted in said barrel for adjustment out of said other end of the barrel past said fixed section and having a reduced projection sliding on said stationary section, a calibrated cap rotatably mounted on the closed end of said barrel and for adjusting said movable section, and a rotatable operating connection between said cap and movable section with its axis of rotation in the line of movement of the movable section.

2. An anvil structure for use on the frame of a micrometer comprising a barrel having a closed end and adapted to form a part of said frame, a stationary anvil section extending part way out of the other end of the barrel and fixed therein against movement relative thereto, a movable anvil section slidably fitted in said barrel for adjustment out of said other end of the barrel past said fixed section, a calibrated cap rotatably mounted on the closed end of said barrel and for adjusting said movable section, and operating connections between said cap and movable section, the movable section having a portion snugly fitting in the barrel, and a reduced contact portion slidable on the fixed anvil section, the snugly fitting portion embodying a stop for abutting the stationary section to limit adjustment of said movable section out of said other end of the barrel.

HAROLD POLLITT.

REFERENCES CITED

The following references are of record in the file of this patent:

UNITED STATES PATENTS

| Number | Name | Date |
| --- | --- | --- |
| 1,473,351 | Lundin | Nov. 6, 1923 |
| 1,517,993 | Julin | Dec. 2, 1924 |

FOREIGN PATENTS

| Number | Country | Date |
| --- | --- | --- |
| 138,943 | Great Britain | 1920 |